United States Patent [19]

Watkins

[11] 4,306,531
[45] Dec. 22, 1981

[54] DEVICE FOR IMPROVING GASOLINE FUEL CONSUMPTION

[75] Inventor: Alfred E. Watkins, Auburn, Me.

[73] Assignee: William Mouradian, Roslindale, Mass.

[21] Appl. No.: 91,700

[22] Filed: Nov. 6, 1979

[51] Int. Cl.³ .............................................. F02M 21/02
[52] U.S. Cl. ..................................... 123/525; 123/557
[58] Field of Search ............... 123/557, 575, 525, 578, 123/576

[56] References Cited

U.S. PATENT DOCUMENTS

| | | | |
|---|---|---|---|
| 2,150,764 | 3/1939 | Farineau | 123/525 |
| 2,315,881 | 4/1943 | Thomas | 123/525 |
| 2,315,882 | 4/1943 | Trimble | 123/525 |
| 4,027,639 | 6/1977 | Amano | 123/557 |
| 4,161,164 | 7/1979 | Muhlberg | 123/525 |

*Primary Examiner*—Ronald H. Lazarus
*Attorney, Agent, or Firm*—Robert T. Gammons

[57] ABSTRACT

A fuel system for supplying gasoline or like vaporizable fuel to the carburetor of an internal combustion engine as a mixture of liquid and vapor wherein the vapor predominates.

18 Claims, 1 Drawing Figure

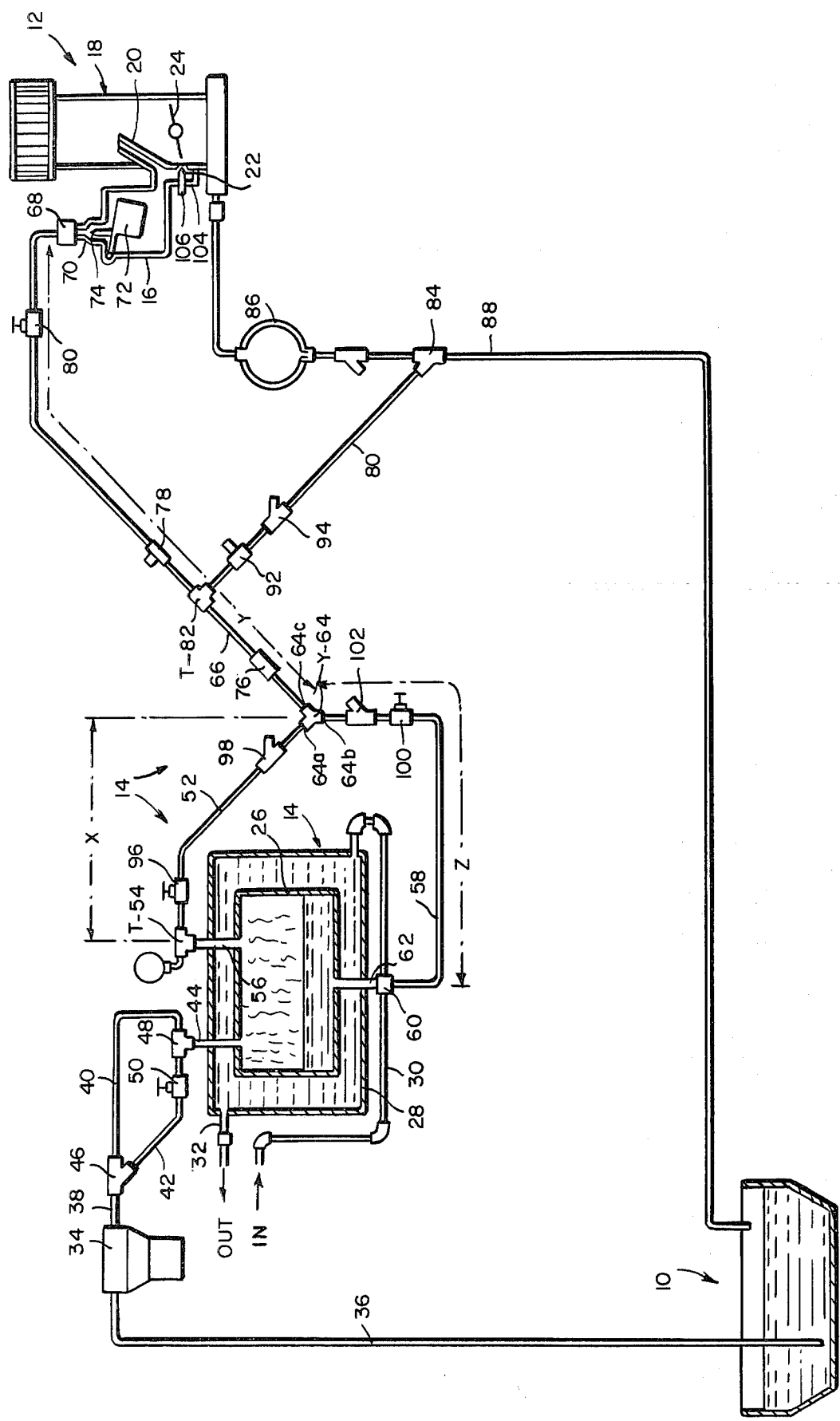

DEVICE FOR IMPROVING GASOLINE FUEL CONSUMPTION

BACKGROUND OF THE INVENTION

It is not unknown to supply gasoline in both its liquid and vapor phases to a carburetor as shown, for example, in Pantano U.S. Pat. No. 2,882,882 wherein gasoline in its liquid phase is piped from the carburetor into a vaporizing chamber and the vapor produced in the vaporizing chamber is piped to the throat of the carburetor. Additionally, gasoline in its liquid phase is piped directly from the float chamber to the throat of the carburetor. A somewhat similar system is shown in Thomas U.S. Pat. No. 2,315,881 wherein gasoline in its liquid phase is heated within a jacketed tank to generate a vapor at the top of the tank and gasoline in its liquid phase and its vapor phase are withdrawn from the bottom and top, respectively, of the tank and delivered, respectively, to the float chamber of the carburetor and to the throat of the carburetor. The system shown in the Thomas patent requires specialized carburetors. In Hirschler U.S. Pat. No. 3,783,841, gasoline is vaporized within a vaporizing tank, gasoline in its liquid phase is drawn off from the bottom of the tank and gasoline in its vaporized form is drawn off at the top of the tank. The gasoline in its vaporized form is condensed thereto, combined with the liquid gasoline and delivered to the carburetor. The system shown in the Hirschler patent functions only during the period of warm-up of the engine to operating temperature, at which time it shuts off and the fuel system reverts to normal operation. The Hirschler system was designed only to control emission during the rich mixture supplied while the engine is cold. A similar system is shown in Ryan U.S. Pat. No. 2,645,906. A system in which gasoline is converted entirely to its vaporized phase for delivery to the carburetor is shown in Chapin U.S. Pat. No. 1,530,882. The systems shown in Ryan and Chapin are prone to vapor lock. The system of the present invention is designed to be operated with standard carburetors without alternation of the latter; to be operative during normal driving conditions as contrasted to warm-up; to minimize pollution; and to be free from vapor lock.

SUMMARY OF THE INVENTION

As herein illustrated, the fuel system comprises a gasoline source and means for delivering a mixture of predominantly vaporized gasoline to the intake chamber of the carburetor, said means comprising means for raising the temperature of the gasoline in its liquid phase to above the ambient temperature, means for separating the vapor phase thus generated, venturi means for saturating the vapor phase with the liquid phase and means connecting the venturi means to the intake chamber of the carburetor for conducting the saturated mixture of vapor and liquid which is predominantly vapor to the carburetor.

The means for raising the temperature of the gasoline in its liquid phase above the ambient temperature comprises a vaporizing chamber to which gasoline in its liquid phase is supplied by means of a pump and the means for effecting vaporization of the liquid gasoline within the vaporizing chamber is a jacket within which the vaporizing chamber is positioned supplied with a heating medium such as the fluid in the cooling system of the combustion engine. Desirably, the temperature of gasoline in its liquid phase is raised to approximately 180° F. There is a conductor pipe connected at one end to the top of the vaporizing chamber and at the other end to the intake of the venturi and there are, respectively, a needle valve and a vapor check valve in that order in the conductor pipe. There is a conductor pipe connected at one end to the bottom of the chamber and at the other end to the throat of the venturi and there are, respectively, a needle valve and a liquid check valve in that order in the conductor pipe. There is a conductor pipe connected at one end to the outlet of the venturi and at its other end to the intake of the carburetor and there are, respectively, a filter, a normally-open solenoid-operated valve and a needle valve in that order in the conductor pipe. There is also means for bypassing the mixture when the normally-open solenoid-operated valve is closed to the gasoline tank which includes a normally-closed solenoid-operated valve and a check valve. The normally-open solenoid-operated valve is opened by turning on the ignition and the normally-closed solenoid-operated valve is, in turn, opened by the turning off of the ignition. Gasoline in its liquid form is supplied from the fuel tank to the vaporizing chamber through forked connections by means of a pump.

The invention will now be described in greater detail with reference to the accompanying drawing which diagrammatically illustrates the system of this invention.

Referring to the drawing, there is shown a fuel tank 10, a carburetor 12 and a gasoline distribution system 14 for supplying a mixture of gasoline in its liquid and vapor phases in which the vapor phase predominates to the carburetor. The system is designed to supply gasoline or other like vaporizable fuel.

The fuel tank 10 is of conventional construction such as may be found on any motor vehicle or other motorized piece of equipment and the carburetor 12 is of conventional design comprising a float chamber 16 connected to one side of the throat 18 by way of a jet pipe 20 and needle controlled port 22 to the interior of the throat and a throttle valve 24 of usual construction and position. Notably, an advantage of the system which is to be described hereinafter resides in the fact that it can be applied to a conventional carburetor without alteration of the latter.

The distribution system 14 by means of which the gasoline is delivered in mixed form, that is, partly liquid and partly vapor from the fuel tank 10 to the float chamber 16 comprises a vaporizing chamber 26 jacketed within a closed container 28 connected at its bottom by a conductor pipe 30 to the bottom of the vehicle radiator and at its top by a conductor 32 to the top of the radiator or, alternatively, to the heater hoses of the vehicle heater so that hot water from the radiator or from the heater flows continuously through the closed container 28 about the vaporizing chamber 26. Gasoline in its liquid form or phase is pumped into the closed chamber 26 from the fuel tank 10 by means of a fuel pump 34, one side of which is connected by a conductor 36 to the fuel tank and the other side of which is connected by a conductor 38 and forked or branch conductors 40 and 42 to a conductor 44 leading into the top of the vaporizing chamber 26. The branch conductors 40 and 42 are connected by a Y 46 and to the conductor 44 by a T 48. Within the branch 42, there is a vent valve 50 which is manually adjustable to control the amount of venting. Gasoline in its liquid phase is supplied to the chamber 26 at a predetermined pressure.

The heating of the gasoline in its liquid phase within the chamber 26 generates a vapor phase above the surface of the gasoline and this is transmitted from the top of the closed chamber 26 through piping X,Y to the float chamber 16 of the carburetor. In addition a small amount of gasoline in its liquid phase is delivered from the bottom of the closed chamber through piping Z,Y to the float chamber 16. The piping X comprises a conductor pipe 52 connected at one end by a T-54 to the upper end of a pipe 56, the lower end of which is connected to the chamber 26. The Z piping comprises a pipe 58 connected at one end by a nipple 60 to one end of a pipe 62, the other end of which is connected to the bottom of the chamber 26. The two pipes 52 and 58 are connected to the intake 64a and throat 64c of Y-64 which constitutes a venturi. Desirably the Y-64 is positioned at the level of the gasoline in the vaporizing chamber. The output 64c of the venturi Y-64 is connected to one end of the Y piping which comprises a conductor pipe 66, the other end of which is connected by a nipple 68 to the top of the float chamber 16 by way of a needle valve assembly 70 comprising a float 72 and needle 74. In the conductor pipe 66, there is a filter element 76, a normally-open solenoid-operated valve 78 and a needle valve 80. The normally-open solenoid-operated valve 78 is opened by turning on the ignition system of the vehicle. Between the filter 76 and the normally-open solenoid-operated valve 78 there is a bypass conductor 80, one end of which is connected by a T-82 to the conductor pipe 66 and the other end of which is connected by a Y-84 to a return conductor 88. A vapor canister 86 is connected between the bottom of the carburetor and Y-84. In the conductor 80 there is a normally-closed solenoid-operated valve 92 and a check valve 94. The normally-closed solenoid-operated valve 92 is opened by turning on the ignition switch. In the conductor pipe 52 there is, respectively, a needle valve 96 and a check valve 98 and in the conductor pipe 58 there is a needle valve 100 and a check valve 102.

The system operates when the ignition key is initially turned on to close the solenoid-operated valve 92, open the solenoid-operated valve 78 and deliver gasoline in its liquid phase through the conductor 58 and 66 to the float chamber 16 of the carburetor. As the temperature of the water in the cooling system rises as controlled by a suitable thermostat, hot water is circulated through the jacket comprising the container 28 to heat the gasoline supplied to the vaporizing chamber 26 to a temperature on the order of 180° F. At this temperature gasoline in its vapor form is generated above the surface of the gasoline at the bottom of the vaporizing chamber 26 and this vaporized gasoline is delivered through the conductor 52 to the venturi Y-64 at a pressure such that it effectively stops the free flow of gasoline in its liquid phase through the conductor 66 to the carburetor chamber 16. The venturi action of the vapor passing through Y-64 entrains some of the gasoline in its liquid phase, so that a mixture of the gasoline vapor and liquid which is predominantly vapor is delivered to the float chamber and this is supplied through the jet 20 to the intake throat of the carburetor. The mixture is in effect a heavy saturated vapor. Such liquid as is entrained and carried in liquid form into the carburetor sinks into a leg 104 at the bottom and is supplied through the port 22 to the throat of the carburetor just below the throttle valve 24. A needle 106 is provided for controlling the flow of gasoline in its liquid form through this port 22. When the engine is stopped by turning off the ignition key, the solenoid-operated valve 78 is closed, the solenoid-operated valve 92 is opened and any gasoline in its liquid form and any vapors within the piping 56, 58, 66 are returned through the conductors 80 and 88 to the fuel tank 10.

While the vaporizing chamber 26 is shown jacketed within closed container 28 to which hot water is supplied from the cooling system of the vehicle, it is within the scope of the invention to provide a source of heat from other than the cooling system, for example, by blowing air around and about the engine block and over the surface of the vaporizing chamber 26 or by providing a heating coil within or about the vaporizing chamber 26, for example, an electric coil.

The system as thus described by supplying a combustible mixture in predominately vaporized form enables more efficient mixing of the fuel with the air for more efficient combustion and, hence, combustion with a minimum of pollution. The percentage of fuel in the mixture in the vaporized form is approximately 90-95% and this is controlled by the manipulation of the needles valves 96 and 100 which, respectively, control the flow of the gasoline in its vapor phase from the top of the vaporizing chamber 26 to the venturi 64-Y and the flow of gasoline in its liquid phase from the bottom of the vaporizing chamber 26 to the throat of the venturi 64-Y. The needle valve controls the rate of flow of the mixture to the float chamber 16. The check valves 46, 94, 98 and 102, respectively, prevent reverse flow of the gasoline in its vapor or liquid forms in the system.

Advantages obtained with the system proposed above are that it can be used with any standard carburetor without modification of the latter, fuel control is achieved without floats and/or valves, all lines are open-ended so that there are no closed ends, the vapor level in all lines is equal, the vapor and liquid are mixed to produce a heavy vapor mix, the emission is substantially zero, the combustion is substantially 95% complete, and after the first three minutes of operation, the engine is running on 95% vapor. Performance and power of the engine are improved and no changes of any kind are required to the original equipment on the vehicle or motor.

It should be understood that the present disclosure is for the purpose of illustration only and includes all modifications or improvements which fall within the scope of the appended claims.

I claim:

1. A fuel system for gasoline combustion engines wherein a carburetor is employed to deliver a combustible mixture to the intake manifold of the engine comprising a gasoline source and means for delivering a mixture of predominantly vaporized gasoline to the intake chamber of the carburetor, said means comprising a vaporizing chamber for holding liquid fuel, means for heating the liquid fuel in the chamber to generate a vapor phase therein above the liquid phase, a first conductor connected at one end to the bottom of the chamber, a second conductor connected at one end to the top of the chamber, a third conductor connected at one end to the carburetor, a Y connecting the opposite ends of the first and second conductors to the third conductor, said Y functioning to transmit liquid fuel from the first conductor to the third conductor and from thence to the carburetor while the engine is cold and for transmitting vaporized fuel from the second conductor to the third conductor and from thence to the carburetor when the engine is hot and wherein the Y functions as a venturi such that the flow of the vaporized fuel through the Y entrains a small amount of liquid fuel.

2. A fuel system according to claim 1 wherein the last-named means is a conductor pipe and wherein a return pipe connects the conductor pipe to the gasoline source and there are valves in the conductor pipe beyond the return pipe and in the return pipe, the valves being actuated to be alternately opened and closed, the valve in the conductor pipe being open when the engine is started and the valve in the return pipe being closed and vice versa when the engine is stopped.

3. A fuel system according to claim 2 comprising a cannister connected to the bottom of the carburetor and to the return pipe for conducting any liquid and vapors in the system when the engine is stopped back to the gasoline source.

4. A fuel system according to claim 1 wherein the last-named means is a conductor pipe comprising a return pipe connecting the conductor pipe to the gasoline tank and valves in the conductor pipe beyond the return pipe and in the return pipe, the valves being alternately opened and closed, the valve in the conductor pipe being open when the engine is started and the valve in the return pipe being closed and vice versa and wherein there is a vapor cannister connector to the bottom of the carburetor and to the return pipe beyond the valve in the return pipe for conducting and vaporized and/or fluid fuel left in the system when the engine is stopped back to the gasoline source.

5. A fuel system according to claim 1 wherein the liquid gasoline is raised to a temperature of from 90° to 200° F.

6. A fuel system according to claim 1 wherein the liquid gasoline is raised to a temperature of 180° F.

7. A fuel system for gasoline combustion engines wherein a carburetor is employed to deliver a combustible mixture to the intake manifold of the engine comprising a gasoline source, a vapor chamber, means for delivering the liquid gasoline to the vapor chamber at a predetermined pressure, means for heating the liquid gasoline in the vapor chamber to a predetermined temperature, venturi means, means for conducting the vapor phase generated within the vapor chamber to the intake of the venturi means, means for connecting the output of the venturi to the intake chamber of the carburetor and means connecting the bottom of the vaporizing chamber to the throat of the venturi.

8. A fuel system according to claim 7 wherein the means connecting the top of the vaporizing chamber to the venturi is a conductor pipe, one end of which is connected to the top of the chamber and the other end of which is connected to the intake of the venturi and there are, respectively, a needle valve and a vapor check valve in that order in the conductor pipe.

9. A fuel system according to claim 7 wherein the means connecting the bottom of the vaporizing chamber to the throat of the venturi is a conductor pipe, one end of which is connected to the bottom of the vaporizing chamber and the other end of which is connected to the throat of the venturi and there are, respectively, a needle valve and liquid check valve in that order in the conductor pipe.

10. A fuel system according to claim 7 wherein the means connecting the output of the venturi to the intake of the carburetor is a conductor pipe connected at one end to the output of the venturi and at its other end to the intake of the carburetor and there are, respectively, a filter, a normally open solenoid-operated valve and a needle valve in that order in the conductor pipe.

11. A fuel system according to claim 10 wherein there is means for bypassing the mixture when the normally open solenoid-operated valve is closed to the source of gasoline.

12. A fuel system according to claim 11 wherein said last-named means includes a normally closed solenoid-operated valve and the check valve in the order named.

13. A fuel system according to claim 10 wherein the normally open solenoid-operated valve is operated by turning on the ignition.

14. A fuel system according to claim 10 wherein the normally closed solenoid-operated valve is operated by turning off the ignition.

15. A fuel system according to claim 11 wherein the means for bypassing the mixture is a conductor piper connected at one end to the conductor pipe extending from the venturi to the carburetor and at its other end to the gasoline source.

16. A fuel system according to claim 1 wherein gasoline in liquid form is supplied to the vaporizing chamber through forked conductor pipes.

17. A fuel system according to claim 1 comprising a fuel pump and wherein a first conductor is connected at one end to the fuel tank and at its other end to the intake side of the pump, a second conductor is connected at one end to the discharge side of the pump, forked conductors are connected at one end to the distal end of the second conductor and a third conductor connects the other ends of the forked conductors to the vaporizing chamber.

18. A fuel system according to claim 1 wherein fuel in its liquid form is pumped to the vaporizing chamber through conductor piping characterized in that there is interposed within the piping branch conductors which branch out from a single pipe dividing the flow into two streams and then return again into a single pipe and wherein there is a vent valve in one of the branch conductors.

* * * * *